United States Patent Office 3,454,410
Patented July 8, 1969

3,454,410
ALKALI-METAL SILICATE PROTECTIVE COATING
John B. Schutt, Silver Spring, and Charles M. Shai, Gambrills, Md., assignors to the United States of America as represented by the Administrator of the National Aeronautics and Space Administration
No Drawing. Filed May 3, 1965, Ser. No. 452,945
Int. Cl. C09d 1/02, 5/32, 5/18
U.S. Cl. 106—74
6 Claims

ABSTRACT OF THE DISCLOSURE

A coating composition and method for processing same has been developed in which the composition is particularly resistant to ultraviolet radiation and wherein the constituents include commercially available potassium silicate solutions and sodium silicate solutions as a vehicles, water, and aluminum phosphate. The utility of the coating is enhanced by the addition of paint pigments, hydrated aluminum oxide, potassium hydroxide, and boric acid.

---

The invention described herein may be manufactured and used by and for the Government of the United States of America for governmental purposes without the payment of any royalties thereon or therefor.

The present invention relates to a novel protective coating and method for producing same, and more particularly, to the composition and method of producing a durable, fireproof protective coating capable of withstanding ultraviolet radiation and having good shelf life.

Satellites and other space vehicles, due to environmental conditions existing in outer space, are coated to provide temperature control, solar pressure control, etc. In particular, a paint for such use, by necessity, must exhibit high resistance to cracking, peeling and flaking when subjected to a wide range of temperature and vacuum variations and ultra-violet radiation.

Since organic paints or paints having organic constituents are not generally applicable as coatings for space vehicles, inasmuch as they are not sufficiently resistant to ultra-violet radiation and particle bombardment, nor are they fireproof, various inorganic paints have been experimented with, hopefully, to provide a coating that will meet the rigorous and exacting requirements needed for a paint to be used for the protection of the exterior of space vehicles. So far, the inorganic paints, including alkali-metal silicate paints that have been used to coat space vehicles have not proven entirely satisfactory since they have had poor adhesion properties, spreadability characteristics, and/or sealing qualities (limited amount of filler material generated). In an attempt to make these paints adaptable to the various space applications and so that they might more properly adhere to the space vehicles, the surfaces to be coated had to be abraded by sand blasting, sand paper or the like. Carrying out this abrading operation resulted in an increase expense by requiring more labor and time. In addition, in many instances abrading turned out to be unsuitable as it often created pits, scratches and other blemishes in the substrate that would have to be covered or sized.

Accordingly, it is an object of the present invention to provide an inexpensive, non-toxic, alkali-metal silicate paint that has good ultra-violet radiation resistance and at the same time can be simply applied to various substrate materials.

It is another object of the present invention to provide an optically reproducable alkali-metal silicate paint capable of being coated on a substrate to a thickness in the order of approximately 4 to 10 mils and having a property of facilitating ease of cleaning.

It is still another object of the present invention to provide an alkali-metal silicate paint having a good adhesive characteristic and being resistant to marring, cracking, chalking and oxidation.

It is an additional object of the present invention to provide a method for forming an alkali-metal silicate paint having the qualities recited in the previously mentioned objects as well as possessing good shelf life.

It is a further object of the present invention to provide a method for sealing an alkali-metal silicate paint, cured under ambient conditions, so that it possesses improved water resistance.

It is still a further object of this invention to provide cleaning compositions which can be used to chemically treat a substrate to insure good adhesive characteristics of a coating to be applied thereto.

These and other objects are attained by the present invention which is a novel inorganic coating composition comprising water ($H_2O$); an alkali-metal silicate, such as potassium silicate, which acts as a dispersing medium (vehicle); and an inorganic phosphate, such as aluminum phosphate [e.g., aluminum ortho-phosphate ($AlPO_4$)] and/or phosphoric acid ($H_3PO_4$), both of which behave as a spreading agent and filler, and, when mixed with water, form a "filler-spreader solution" (solution or dispersion which contains filler material and enhances the spreadability of a paint composition to a substrate). To this composition is added a paint pigment according to the color desired, e.g., titanium dioxide ($TiO_2$) and/or zinc oxide (ZnO) being added to obtain a white color. In addition, certain physical properties of the coating can be improved even further by aluminum oxide ($Al_2O_3 \cdot nH_2O$), aluminum hydroxide [$AlO(OH) \cdot nH_2O$] and/or potassium hydroxide (KOH) being added to the composition.

The invention further includes the process of forming the composition itself, by thoroughly mixing in a container, aluminum phosphate, e.g., aluminum ortho-phosphate, and water to form an acidic "filler-spreader solution" (a "filler-spreader solution" having a pH less than 7), adding thereto, under constant agitation, the alkali-metal silicate vehicle, e.g., potassium silicate; and combining therewith the paint pigment, e.g., titanium dioxide. Should it be advisable to use aluminum hydroxide in forming the coating, then, the aluminum hydroxide would be dispersed in the "filler-spreader solution"-alkali-metal silicate combination prior to the addition of the paint pigment.

The invention also incorporates novel surface treating compositions useable to prepare a substrate prior to applying the coating thereto and methods for sealing the coating so that it will have improved water resistance should it be desirable to cure it under ambient conditions. A detailed discussion of the various treating compositions, depending upon the material of the substrate to which the coating is to be applied, and sealing methods will be disclosed hereinafter.

DESCRIPTION OF THE INVENTION

To provide a better understanding of the invention, Table I below lists the ingredients, in percent (%) by weight, that are combined to form the alkali-metal silicate coating.

In this table and in the samples that are presented hereinafter, the alkali-metal silicate and potassium silicate are water solutions. Also, the various examples that are given were made with the potassium silicate water solution being of 35% by weight of solids. Accordingly, whenever water is listed as a separate ingredient, it is in addition to the water already in the potassium silicate solution, While the samples were processed with a given concentration of potassium silicate, this is not a limiting factor because water as a separate ingredient can be added or deleted in accordance with the solid contents of the potassium silicate.

TABLE I

| Ingredients: | Range (percent by weight) |
| --- | --- |
| Alk-metal silicate (solution)[1] | 35–70 |
| Pigment | 0–40 |
| Aluminum phosphate | 0–13 |
| Water | 0–24 |
| Aluminum oxide | 0–40 |
| Aluminum hydroxide | 0–60 |
| Potassium hydroxide | 0–15 |
| Phosphoric acid (pH 2 or greater)[1] | 0–5 |

[1] When the coating composition includes only the alkali-metal silicate and the pH 2 or greater phosphoric acid solution, then, the alkali-metal silicate and pH 2 or greater phosphoric acid have been found to be 90 to 99 and 1 to 10 percent by weight, respectively.

As can readily be seen by observing Table I, the percent by weight of the ingredients listed therein can be varied and some of them may or may not be used depending upon the characteristics desired of the coating. A detailed analysis of the combination of the ingredients listed in the table to form the alkali-metal silicate coating, as well as modifications thereto will be presented hereinafter.

First, however, a description of the steps for processing a preferred embodiment of the coating, wherein the ingredients thereof are aluminum ortho-phosphate ($AlPO_4$), water ($H_2O$), potassium silicate and titanium dioxide ($TiO_2$) is now presented.

Processing the coating.—The dry aluminum ortho-phosphate is thoroughly mixed with water in a container to form an acidic "filler-spreader solution" which, in turn, is slowly combined, under a condition of constant agitation, with the potassium silicate. Thereafter the thereafter the titanium dioxide paint pigment is added; and the combination of all the ingredients is stirred until they are interdispersed and chemically reacted (approximately one half hour). Alternatively, the combination of all the ingredients can be ball milled to better insure the breakdown of agglomerated pigments and hard particles and to promote the chemical reactions between the ingredients. For example, in forming a coating using zinc oxide (ZnO) as the pigment, ball milling should be carried out for approximately one hour (enough time for the acidic "filler-spreader solution" to be sufficiently reacted with the other ingredients and not so long as to yellow the mixture).

Should it be necessary to ball mill in excess of an hour, special precautions can be taken to avoid the yellowing of the paint. To prevent this condition form occurring, prior to ball milling the paint, an ammonium acetate solution of 4% or greater concentration is ball milled for approximately 8 hours, after which time the ammonium acetate solution is rinsed away with water. Thereafter, when the paint is ball milled, generated zincate ions combined with the residual ammonium acetate (that small portion of the ammonium acetate that is retained by the ball mill environment after rinsing) instead of combining with impurities therein.

Generally, it might be stated that the most basic coating composition comprises potassium silicate and phosphoric acid (pH 2 or greater, with the pH 2 being preferred). When these ingredients are combined in the proper proportions, as will be specified hereinafter, and processed in the manner described hereinabove in connection with the coating including aluminum phosphate in placeof phosphoric acid, they react in such a way that compounds are formed which act as filler materials to promote water resistance and good optical reproducibility of the coating. The potassium silicate in a water solution is written:

$K^+ + OH^- + H_4SiO_4$. Now, when the phosphoric acid is added thereto, the following reactions occur:

$$H_3PO_4 \rightarrow H_2PO_4^- + H^+ \quad (1)$$
$$K^+ + H_2PO_4^- + nH_4SiO_4 \rightarrow KH_2PO_4 \cdot nH_4SiO_4 \downarrow \quad (2)$$
$$H_2PO_4^- \rightarrow HPO_4^= + H^+ \quad (3)$$
$$HPO_4^= \rightarrow PO_4^\equiv + H^+ \quad (4)$$
$$3K^+ + PO_4^\equiv \rightarrow K_3PO_4 \downarrow \quad (5)$$

The reaction products $KH_2PO_4 \cdot nH_4SiO_4$ and $K_3PO_4$ in Equations 2 and 5, respectively, serve as filler materials in the coating. In addition, the generated $KH_2PO_4 \cdot nH_4SiO_4$ inhibits the leaching of silicic acid from the coating, and therefore, renders the coating substantially water insoluble. The phosphoric acid, in being used as part of the coating, in addition to reacting to form precipitates (filler materials), also increases the surface tension difference between the coating and the substrate to which it is to be applied to enhance the spreadability of the coating.

Sample I is a coating composition containing potassium silicate and a phosphoric acid solution (pH 2 or greater) with the limits thereof specified.

Sample I

| Ingredients: | Range (percent by weight) |
| --- | --- |
| Potassium silicate (water solution) | 90–99 |
| Phosphoric acid (pH 2 or greater) | 1–10 |

Example I is a coating composition within the limits recited in Sample I.

Example I

| Ingredients: | Range (percent by weight) |
| --- | --- |
| Potassium silicate (35% solids) | 95.6 |
| Phosphoric acid (pH 2) | 4.4 |

To form a paint composition of a desired color, any one of the paint pigments, as will be recited hereinafter, can be added to the potassium silicate-phosphoric acid coating, depending upon the color that the paint is to have. Sample II is such a paint composition with the limits of each of the ingredients being specified.

Sample II

| Ingredients: | Range (percent by weight) |
| --- | --- |
| Potassium silicate (water solution) | 38–70 |
| Pigment | 18–40 |
| Phosphoric acid (pH 2 or greater) | 0.2–0.6 |
| Water | 10–24 |

Example II below is a paint composition within the limits recited in Sample II.

Example II

| Ingredients: | Range (percent by weight) |
| --- | --- |
| Potassium silicate (35% solids) | 42 |
| Pigment | 35 |
| Phosphoric acid (pH 2) | 0.3 |
| Water | 22.7 |

While potassium silicate paints containing phosphoric acid have performed satisfactorily, they must be processed quite exactly because the pH factor of the phosphoric acid is very critical and must not be less than 2. It has been discovered that paints can be processed under less restricting conditions if a form of hydrated aluminum oxide, such as aluminum oxide ($Al_2O_3 \cdot nH_2O$) and/or aluminum hydroxide ($AlO(OH) \cdot nH_2O$) are added to the composition. Although these compounds cause the paints to dry more slowly, they increase the flexibility and enhance the ultra-violet stability of the paints. Samples III and IV are paint compositions containing aluminum hydroxide, and aluminum oxide, respectively. The limits for each ingredient are specified.

Sample III

Ingredients: Range (percent by weight)
- Potassium silicate (water solution) _____ 38–70
- Pigment _____ 18–40
- Aluminum hydroxide _____ 20–30
- Water _____ 10–20
- Phosphoric acid _____ 0.2–0.6

Sample IV

Ingredients: Range (percent by weight)
- Potassium silicate (water solution) _____ 38–70
- Pigment _____ 18–35
- Aluminum oxide _____ 5–30
- Water _____ 10–20
- Phosphoric acid _____ 0.5–1.5

Examples III and IV are paint compositions within the limits recited in Samples III and IV, respectively.

Example III

Ingredients: Range (percent by weight)
- Potassium silicate (35% solids) _____ 44.5
- Pigment _____ 22.2
- Aluminum hydroxide _____ 21.6
- Water _____ 11.1
- Phosphoric acid _____ 0.6

Example IV

Ingredients: Range (percent by weight)
- Potassium silicate (35% solids) _____ 51
- Pigment _____ 23
- Aluminum oxide _____ 10
- Water _____ 15
- Phosphoric acid _____ 1

In the case where aluminum oxide and/or aluminum hydroxide are to be a part of the paint composition, they are mixed with the potassium silicate prior to the addition thereto of the acidic "filler-spreader solution" of phosphoric acid and water. This is the only variation in the process referred to hereinabove. The remainder of the process is carried out in the same manner as already described.

Another phosphate that has performed excellently, in forming a paint is aluminum phosphate, particularly aluminum ortho-phosphate. Sample V is a paint composition including aluminum ortho-phosphate as an ingredient. The prescribed limits for each ingredient are specified.

Sample V

Ingredients: Range (percent by weight)
- Potassium silicate (water solution) _____ 38–70
- Pigment _____ 18–33
- Aluminum hydroxide _____ 20–40
- Aluminum ortho-phosphate _____ 1.6–3.2
- Water _____ 3–10

Example V is a paint composition within the limits recited in Sample V.

Example V

Ingredients: Range (percent by weight)
- Potassium silicate (35% solids) _____ 46.8
- Pigment _____ 21.1
- Aluminum hydroxide _____ 25.8
- Aluminum ortho-phosphate _____ 1.7
- Water _____ 4.6

From the above discussion it can be observed that alkali-metal silicate paints can be processed using phosphoric acid alone, aluminum phosphate alone, either of these two ingredients with aluminum oxide and/or aluminum hydroxide, or with a combination of these four ingredients. In addition to phosphoric acid and aluminum phosphate, potassium phosphates ($K_3PO_4$ and $KH_2PO_4$) and manganese phosphate [$Mn_3(PO_4)_2$] have been used in processing the paint. From this representative group it can readily be predicted that other inorganic phosphates will perform satisfactorily.

Example A is a paint composition with manganous phosphate.

Example A

Ingredients: Range (percent by weight)
- Potassium silicate (35% solids) _____ 45.7
- Pigment _____ 20.6
- Aluminum hydroxide _____ 24.7
- Water _____ 4.9
- Manganous phosphate _____ 4.1

It has been observed that the addition of potassium hydroxide (KOH) to the paints causes filler material to be generated and enhances the flexibility, adhesion and cleanability of the paints. Now, if in addition, aluminum oxide  ($Al_2O_3 \cdot nH_2O$) or aluminum hydroxide $$(AlO(OH) \cdot nH_2O)$$

is mixed with the potassium hydroxide (preferably in a glass or glass lined container to avoid contamination) at 150 to 220 degrees Fahrenheit (° F.) for 15 to 60 minutes, including the time required to reach the desired temperature, and the mixture thereof is combined with the potassium silicate, prior to its addition to the acidic "filler-spreader solution," the paints formed have excellent shelf life. It should be mentioned that similar results are obtained with aluminum hydroxide $$[Al(OH) \cdot nH_2O]$$

being substituted for aluminum oxide ($Al_2O_3 \cdot nH_2O$). 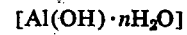

Sample VI is a paint composition comprising the potassium hydroxide and aluminum oxide. The limits for each ingredient are specified.

Sample VI

Ingredients: Range (percent by weight)
- Potassium silicate (water solution) _____ 38–70
- Pigment _____ 15–35
- Aluminum oxide _____ 5–20
- Aluminum ortho-phosphate _____ 1–3.5
- Potassium hydroxide _____ 1–5
- Water _____ 0–10

Example VI is a paint composition within the limits specified in Sample VI.

Example VI

Ingredients: Percent by weight
- Potassium silicate (35% solids) _____ 55.1
- Pigment _____ 22.0
- Aluminum oxide _____ 16.3
- Aluminum ortho-phosphate _____ 2.1
- Potassium hydroxide _____ 4.5

While the process just described in connection with paints comprising potassium hydroxide and aluminum oxide performs adequately, the addition of these ingredients to the composition permits an alternate process to be used in making the paint. In this instance, the water, potassium hydroxide, and aluminum oxide are combined to form a basic "filler-spreader solution" (a "filler-spreader solution" having a pH greater than 7), which is heated for 15 to 60 minutes within the temperature range of 150 to 220 degrees Fahrenheit, the combination thereof being under constant agitation. The pigment is dispersed in the potassium silicate. While the heated combination (basic "filler-spreader solution") is still at the elevated temperature, the pigmented-potassium silicate dispersion is added thereto. The temperature is then reduced to be approximately 25 percent lower than that at which the combination was heated, at which time the composition is cooled to room temperature. Finally, the aluminum ortho-phosphate is added along with any water that was lost in the heating process. During all of the above stages constant agitation is necessary.

Should it be desirable to have additional filler material in the paint, potassium permanganate ($KMnO_4$) and manganous sulphate ($MnSO_4$) can be added. In addition, manganous sulphate, alone, helps to provide better bonding (adhesion) between the substrate and paint. Because these ingredients can react to give manganese dioxide, which is brown, it will, in general, be applicable primarily to paints which are to have this color or are compatible therewith. Sample VII illustrates the limits of the various ingredients used in processing a paint containing these ingredients.

Sample VII

| Ingredients: | Range (percent by weight) |
|---|---|
| Potassium silicate (water solution) | 38–70 |
| Pigment | 14–35 |
| Aluminum oxide | 0–20 |
| Potassium hydroxide | 0–5 |
| Potassium permanganate | 0.1–2 |
| Manganous sulphate | 0.1–2 |
| Water | 14–18 |
| Aluminum ortho-phosphate | 0.5–1.8 |

Example VII is a paint made within the limits specified in Sample VII.

Example VII

| Ingredients: | Percent by weight |
|---|---|
| Potassium silicate (35% solids) | 50.6 |
| Aluminum oxide | 11.3 |
| Pigment | 16.9 |
| Potassium hydroxide | 2.8 |
| Manganous sulphate | 0.3 |
| Potassium permanganate | 0.3 |
| Water | 16.9 |
| Aluminum ortho-phosphate | 0.9 |

While the paints described so far perform adequately, it has been found that the addition of boric acid ($H_3BO_3$) to a majority of them results in harder paints having somewhat improved hydrolytic stability. The boric acid, from 0.3 to 1.0 percent by weight, merely replaces a portion of the phosphates in the paints. Sample VIII is a paint containing boric acid with the limits of the various ingredients specified.

Sample VIII

| Ingredients: | Range (percent by weight) |
|---|---|
| Potassium silicate (water solution) | 38–70 |
| Pigment | 20–35 |
| Aluminum hydroxide | 15–35 |
| Aluminum ortho-phosphate | 0.1–0.6 |
| Water | 14–18 |
| Boric acid | 0.3–1 |

Example VIII is a paint composition within the limits set out in Sample VIII.

Example VIII

| Ingredients: | Range (percent by weight) |
|---|---|
| Potassium silicate (35% solids) | 41.5 |
| Pigment | 24.9 |
| Aluminum hydroxide | 16.6 |
| Aluminum ortho-phosphate | 0.3 |
| Water | 16.2 |
| Boric acid | 0.5 |

The paints discussed above are non-toxic. When a toxic paint can be tolerated, however, antimonous sulfide ($Sb_2S_3$) can be added to the paint composition to further improve its properties by better insuring the water resistance and optical reproducibility thereof, increasing the filler material therein, and more important yet, enhancing the adhesion between the paint and substrate material to which it is to be applied. Sample IX, below, shows the limits of the various ingredients used in processing a paint containing these ingredients. While this sample contains a phosphate, it has been noted that an antimonous sulfide paint can be processed without the addition of a phosphate. However, as mentioned above such a paint would be highly toxic.

Sample IX

| Ingredients: | Range (percent by weight) |
|---|---|
| Potassium silicate (water solution) | 38–70 |
| Pigment | 20–35 |
| Aluminum hydroxide | 13–20 |
| Antimonous sulfide | 0.5–3 |
| Water | 13–18 |
| Aluminum ortho-phosphate | 0.1–1.5 |

Example IX is a paint made within the limits specified in Sample IX.

Example IX

| Ingredients: | Percent by weight |
|---|---|
| Potassium silicate (35% solids) | 41.5 |
| Pigment | 24.7 |
| Aluminum hydroxide | 16.5 |
| Antimonous sulfide | 1.0 |
| Water | 15.6 |
| Aluminum ortho-phosphate | 0.7 |

In the discussion so far presented, the term pigment has been used generally because it has been noted that any one of the well known pigments can be used in the paint composition depending on the color desired. All such pigments would fall within the limits prescribed in the above samples and examples. A list of some of the pigments tried and the colors obtained thereby are given below in Table II.

TABLE II

| Pigment | Symbol | Paint Color |
|---|---|---|
| Zinc oxide | ZnO | White. |
| Titanium dioxide | $TiO_2$ | Do. |
| Rhodamine B | | Pink. |
| Ferric oxide | $Fe_2O_3$ | Red-brown. |
| Cadmium sulfide | CdS | Yellow. |
| Chromite | $FeCr_2O_4$ | Black. |
| Cupric oxide plus Carbon black | $Cu_2O+C$ | Do. |
| Ilmenite | $FeTiO_3$ | Brown-black. |
| Chromic oxide | $Cr_2O_3$ | Green. |
| Manganese dioxide | $MnO_2$ | Brown. |

Example V' is an example of a pigmented green paint processed with the ingredients and within the limits specified in Sample V above.

Example V'

| Ingredients: | Percent by weight |
|---|---|
| Potassium silicate (35% solids) | 40.9 |
| Chromic oxide | 24.5 |
| Aluminum hydroxide | 16.3 |
| Aluminum ortho-phosphate | 2.0 |
| Water | 16.3 |

In all of the examples presented hereinabove, the percentage of pigment specified applies to colored and white paint compositions. However, as to a black paint made with carbon black as a pigment, these examples are not generally applicable because of the carbon black. According, Sample a is included herein to illustrate the limits by weight of a black paint having carbon black as a pigment. Cupric oxide ($Cu_2O$) is used therein as an additional pigment to control uniformity of the finish, and titanium dioxide is added to supplement the filler material.

Sample a

| Ingredients: | Range (percent by weight) |
|---|---|
| Potassium silicate (water solution) | 35–70 |
| Carbon black | 0.5–4 |
| Cupric oxide | 2–5 |
| Water | 10–46 |
| Aluminum hydroxide | 10–30 |
| Titanium dioxide | 0.1–3 |
| Aluminum ortho-phosphate | 0.5–13 |

Although Table II above lists some inorganic pigments, organic pigments or dyes would work equally as well.

However, the paints produced would not necessarily be applicable for satellite application because they could lack ultra-violet stability.

While the invention has been described thus far with reference to potassium silicate being the alkali-metal silicate vehicle, this is not to be construed as limiting since the various other alkali-metal silicates such as sodium silicate, lithium silicate, etc., or a mixture of such silicates, can be employed as the vehicle of the coating composition. For example, a paint sample, Sample X, using sodium silicate as a vehicle, is as follows:

Sample X

Ingredients: Range (percent by weight)
- Sodium silicate (water solution) _____ 38–70
- Zinc oxide _____ 20–35
- Aluminum oxide _____ 5–15
- Aluminum ortho-phosphate _____ 1–10
- Water _____ 15–25

Example X is a particular paint composition comprising the ingredients listed in Sample X within the limits specified.

Example X

Ingredients: Percent by weight
- Sodium silicate (35% solids) _____ 42.2
- Zinc oxide _____ 25.3
- Aluminum oxide _____ 9.5
- Aluminum ortho-phosphate _____ 2.1
- Water _____ 20.9

It is important to note that the ingredients used in processing the various paints enumerated hereinabove were those commercially available and were not manufactured exclusively for the purpose so used nor in accordance with any particular specifications relating to the intended use.

The coatings and paints, so far discussed, can be applied directly to substrates, such as aluminum, steel, plastics, cellulose materials, ceramics etc., in any well known manner, including spraying, brushing, flow coating, etc. Also, as with other types of paints, the substrates can be cleaned and/or primed prior to the application of any paint thereto. These latter approaches are particularly applicable to the painting of satellites and space vehicles so that the paints can more adequately perform their intended purpose in the space environment.

Surface treatment of the substrate

Surface treatment of aluminum substrates is accomplished by the application thereto of about 35 percent phosphoric acid solution, for approximately 30 minutes. Following this phosphate treatment, the substrate is washed with water and dryed by any well known means such as air drying. As an alternative to the phosphate treatment, one of the common chromic acid bathes for surface treating aluminum can be used. This latter treatment performs best when the paint includes potassium hydroxide. By the use of these treating processes, the paint generally can be applied directly to an aluminum surface without the prior application thereto of a primer. When it is intended that the aluminum will be primed before being painted, then, the surface thereof can be degreased using any of the common degreasing agents such as acetone.

Steel substrates can be surface treated in the usual manner with hydrochloric acid. In addition, the phosphate treatment bath, applicable to aluminum, can also be used as it performs equally as well with steel. Again, such surface treatments generally preclude the use of a primer.

In the fields of plastics, epoxys and polyesters, for example, are prepared prior to painting by the use of a solution comprising an alkali-metal hydroxide, such as potassium hydroxide, and potassium permanganate. An alternative treatment is with a solution comprising hydroflourosilicic acid and potassium permanganate. The quantities of the various ingredients used in these solutions are not critical.

While various methods have been discussed in the preparation of various substrate materials before the application of paint thereto, it must be remembered that these surface treating methods are generally only necessary when the substrate material will have a critical use and where the surface thereof, cannot tolerate even the slightest bit of contamination.

Primers

The compositions of primers are much the same as the composition of the various paints; and as, in the usual case, in the processing of primers, the pigment would be omitted or included therein in a lesser amount than in the paints, depending on the use thereof. Similarly, for the most part, primers can be processed substantially as outlined above in connection with the paints. It has been noted, however, that the process for making primers, including potassium hydroxide and aluminum hydroxide as ingredients, can be modified by adding the aluminum ortho-phosphate and/or phosphoric acid to the basic "filler-spreader solution" instead of the basic "filler-spreader solution" vehicle pigment combination.

The following are samples of primers.

Sample A

Ingredients: Range (percent by weight)
- Potassium silicate (water solution) _____ 35–45
- Zinc oxide _____ 17–22
- Aluminum hydroxide _____ 17–22
- Phosphoric acid _____ 0.1–2.1
- Water _____ 18–22

Sample B

Ingredients: Range (percent by weight)
- Potassium silicate (water solution) _____ 35–50
- Aluminum hydroxide _____ 35–45
- Potassium hydroxide _____ 1.7–2.4
- Water _____ 18–22
- Phosphoric acid _____ 0.1–2
- Hydrofluorosilicic acid _____ 0.1–2.5
- Potassium permanganate _____ 0–1

Sample C

Ingredients: Range (percent by weight)
- Potassium silicate (water solution) _____ 35–50
- Aluminum ortho-phosphate _____ 1.5–2.5
- Aluminum hydroxide _____ 30–50
- Potassium hydroxide _____ 1–3
- Water _____ 17–20
- Manganous sulphate _____ 0–1
- Potassium permanganate _____ 0–1

Sample D

Ingredients: Range (percent by weight)
- Potassium silicate (water solution) _____ 35–50
- Aluminum hydroxide _____ 30–40
- Aluminum ortho-phosphate _____ 8–14
- Water _____ 15–18

Curing

The paint can be cured by air drying and/or baking, there being at least a 24 hour air drying time allowed for the primer prior to application of the paint. With most paints, a drying period of one hour results in the paints having sufficient surface hardness for handling purposes. Generally, however, where a paint is to be subjected to vigorous environmental conditions (extended exposure to dampness) or in intimate contact with water for an extended period of time, the air drying time should be from approximately 3 to 10 days depending upon the particular use desired. In fact, curing can be accelerated by air drying the paint for at least an hour and then baking it for 15 minutes to 3 hours (depending on the paint) at temperatures from 150 to 600 degrees Fahrenheit.

Surface sealing painted surfaces

To better insure hydrolytic stability of the alkali-metal silicate vehicle and to assure against loss of adhesion under prolonged exposure of the paint to humid environments, various surface sealing treatments can be applied to the painted surface. These treatments can be in the form of a one solution or a two solution application to the painted surface.

When a paint has been processed by the inclusion therein of potassium hydroxide as a separate ingredient, sealing is accomplished with the one solution application by performing the following steps: (1) brushing, spraying or dipping the painted surface with a phosphoric acid solution, (2) allowing this solution to remain thereon for approximately 2 minutes and (3) wiping the excess of the solution from the painted surface. The concentration of the phosphoric acid is not critical; however, concentrated solutions are preferred.

When potassium hydroxide has not been added to the paint, as a separate ingredient, then the sealing is accomplished by the two solution application. First, the painted surface is treated with a potassium hydroxide solution which is allowed to remain thereon for at least 30 seconds but less than 5 minutes, after which time, the excess is wiped off. The concentration of this solution is not critical; however, concentrated solutions are preferred. Then, the method of application and removal of the phosphoric acid is the same as previously mentioned above in connection with the one solution application.

While the two sealing procedures thus far described have limited applications, a more general procedure (another one solution application) suitable for all alkali-metal silicate paints, whether or not they contain potassium hydroxide as a separate ingredient, involves treating the painted surface with a solution comprising potassium dihydrogen phosphate ($KH_2PO_4$), alkali-metal hydroxide (e.g., potassium hydroxide), phosphoric acid, water and a base soluble paint pigment (e.g., zinc oxide). While the paint pigment assists, it is not absolutely essential that it be in the solution. The solution is made by dissolving the potassium dihydrogen phosphate and the paint pigment, e.g., zinc oxide in the potassium hydroxide solution. Once the ingredients are dissolved in the potassium hydroxide solution, the phosphoric acid is slowly added and the solution is simultaneously agitated and heated to between 150 and 220 degrees Fahrenheit until all precipitates are dissolved. Thereafter, the solution is cooled to room temperature prior to being applied to the pinted surface by any of the above mentioned methods. Sample 1 is a solution of this type within the limits of the various ingredients specified.

SAMPLE 1

| Ingredients: | Range (percent by weight) |
| --- | --- |
| Potassium hydroxide | 10–30 |
| Zinc oxide (pigment) | 10–25 |
| Potassium dihydrogen phosphate | 0–15 |
| Water | 10–30 |
| Phosphoric acid | 50–80 |

When the primers and/or paints comprise potassium permanganate ($KMnO_4$), they can be treated with a manganous sulphate ($MnSo_4$) one solution application, the concentration of which is not critical, so that it reacts with the potassium permanganate to form the sealer.

Surface treated paints, using any one of the treating approaches referred to above, can be re-cured by air drying, baking, or a combination thereof. In general, the longer the air drying time, the greater will be the stability of the paints in humid or wet environments. The treated paints can be basked at 150 to 600 degrees Fahrenheit for about 1 hour after an air-cure time of about 4 hours.

SUMMARY

To provide one with a better understanding of the invention, particularly as it is adapted to use in coating a satellite having an outer aluminum surface, a detailed description of the surface treatment of the satellite and the primer and paint compositions, preparations and applications to the satellite surface is not presented.

The aluminum outer surface is first degreased by wiping it clean with a cloth saturated with any standard degreasing agent such as a solution of acetone. Next, a primer, of the type specified below, is applied to the degreased surface by a spraying means or the like and air cured for about 24 hours.

Primer

| Ingredients: | Weight in grams |
| --- | --- |
| Potassium silicate (35% solids) | 100.0 |
| Aluminum oxide | 20.0 |
| Phosphoric acid (pH 2) | 1.0 |
| Aluminum ortho-phosphate | 2.4 |
| Potassium hydroxide (27 normal solution) | 10.0 |
| Water | 20.0 |
| Total | 153.4 |

The primer is processed as follows:

The 10 grams of potassium hydroxide and the 20 grams of aluminum oxide are combined with the 20 grams of water. Then the 2.4 grams of aluminum ortho-phosphate are added; and the mixture, while being constantly agitated, is heated to 220 degrees Fahrenheit for approximately one half hour. Once the aluminum ortho-phosphate is dissolved, the 1.0 gram of phosphoric acid is added. Next, the mixture is cooled to room temperature, while being stirred, to form a basic "filter-spreader solution." Finally, the basic "filter-spreader solution" is slowly added to the potassium silicate vehicle, and the resultant mixture is vigorously agitated for about 30 minutes.

Once the primer has been air-cured for 24 hours, the paint, of the type specified below, is applied to the primed surface by a spraying means or the like.

Paint

| Ingredients: | Weight in grams |
| --- | --- |
| Potassium silicate (35% solids) | 100.0 |
| Zinc oxide | 30.0 |
| Aluminum oxide | 20.0 |
| Water | 30.0 |
| Potassium hydroxide (27 normal solution) | 5.4 |
| Aluminum ortho-phosphate | 5.0 |
| Total | 190.4 |

The paint is processed as follows:

The 5.4 grams of potassium hydroxide are mixed in a container with the 30 grams of water, and the 20 grams of aluminum oxide are combined therewith. This combination of ingredients is stirred until they are thoroughly dispersed. Thereafter, the combination is heated under constant agitation at 220° F. for approximately 45 minutes to form a basic "filler-spreader solution." The 100 grams of potassium silicate are mixed with the 30 grams of zinc oxide in a vessel until the zinc oxide is throughly dispersed in the potassium silicate. While the heated combination is still at 220° F. and after the 45 minutes has elapsed, the mixture is poured from the vessel into the container where it is intermixed with the combination in the container. The temperature is then adjusted to be at 150° F., at which time, the heat is removed from the container and contents thereof are cooled to room temperature. Finally, the 5 grams of aluminum ortho-phosphate are added to the container; and any water that had been lost during the heating process is replenished. During all the stages, referred to above, the contents in the container are under constant agitation.

The paint, after being applied to the aluminum surface of the satellite, is cured at ambient conditions for at least 3 days. Curing in this manner is preferable to curing at elevated temperatures (baking) because, in many instances, the satellite, that is being painted, may very well contain instruments and components that would be sensitive to high temperatures and be damaged thereby; and in addition, the oven used in the curing process could possibly act as a source of contamination to the paint, if proper precautions are not taken.

Whereas the primary use of the instant invention is for satellite coatings, it may also find application, because of its unique characteristics and ease of preparation, as a general purpose coating. In this respect, the coating has been successfully applied to cellulose material, cement products, plastics, aluminum, zinc alloys and steels.

Although the foregoing disclosure relates to preferred embodiments of the invention, it is obvious that numerous modifications and alterations may be made without departing from the spirit and scope of the invention set forth in the appended claims.

What is claimed is:

1. A coating composition consisting essentially of a mixture of ingredients by weight of potassium silicate solution of 35 to 70 percent by weight, water in an amount not more than 24 percent by weight, aluminum phosphate of 0.5 to 13 percent by weight, and an inorganic paint pigment in an amount not more than 40 percent by weight.

2. The coating composition of claim 1 further comprising aluminum oxide in an amount not more than 40 percent by weight.

3. The coating composition of claim 1 further comprising hydrated aluminum oxide in an amount not more than 60 percent by weight.

4. The coating composition of claim 3 further comprising potassium hydroxide in an amount not more than 15 percent by weight.

5. The coating composition of claim 1 further comprising boric acid of 0.3 to 1.0 percent by weight.

6. The coating composition of claim 1 wherein said aluminum phosphate is aluminum ortho-phosphate and said inorganic pigment is zinc oxide.

References Cited

UNITED STATES PATENTS

| | | | |
|---|---|---|---|
| 1,552,270 | 9/1925 | Burke | 106—84 |
| 2,077,258 | 4/1937 | Pitt | 106—74 |
| 2,493,693 | 1/1950 | Parkinson | 106—74 |
| 2,784,060 | 3/1957 | Santmyers | 106—74 |
| 2,807,552 | 9/1957 | Robinson | 106—74 |
| 2,895,838 | 7/1959 | Ilenda | 106—74 |
| 2,928,750 | 3/1960 | Watts | 106—84 |
| 2,964,415 | 12/1960 | Payne et al. | 106—74 |
| 2,995,453 | 8/1961 | Noble | 106—85 |
| 3,047,442 | 7/1962 | Bozzacco | 106—74 |
| 3,138,471 | 6/1964 | Wygant | 106—84 |
| 3,178,299 | 4/1965 | Wilborn et al. | 106—74 |
| 3,214,302 | 10/1965 | Brodt | 106—74 |
| 3,285,757 | 11/1966 | Cornely | 106—84 |

OTHER REFERENCES

Vail, Soluble Silicates, vol. II, Reinhold Publishing Corp. N.Y., 1952, pp. 310–313, 268.

JAMES E. POER, *Primary Examiner*.

U.S. Cl. X.R.

106—84